US011626629B2

(12) United States Patent
Lenz

(10) Patent No.: US 11,626,629 B2
(45) Date of Patent: Apr. 11, 2023

(54) METHOD FOR PERFORMING A TEST OF A THERMAL MANAGEMENT SYSTEM

(71) Applicant: AUDI AG, Ingolstadt (DE)

(72) Inventor: Michael Lenz, Dietfurt (DE)

(73) Assignee: AUDI AG, Ingolstadt (DE)

( * ) Notice: Subject to any disclaimer, the term of this patent is extended or adjusted under 35 U.S.C. 154(b) by 126 days.

(21) Appl. No.: 17/186,388

(22) Filed: Feb. 26, 2021

(65) Prior Publication Data

US 2021/0351448 A1 Nov. 11, 2021

(30) Foreign Application Priority Data

May 5, 2020 (DE) ...................... 10 2020 112 038.9

(51) Int. Cl.
*H01M 10/48* (2006.01)
*H01M 10/625* (2014.01)
*B60L 58/24* (2019.01)

(52) U.S. Cl.
CPC ........... *H01M 10/486* (2013.01); *B60L 58/24* (2019.02); *H01M 10/625* (2015.04); *B60L 2240/545* (2013.01); *H01M 2220/20* (2013.01)

(58) Field of Classification Search
CPC .............. B60L 58/24; B60L 2240/545; H01M 10/625; H01M 2220/20; G01M 99/005
See application file for complete search history.

(56) References Cited

U.S. PATENT DOCUMENTS

2014/0052411 A1* 2/2014 Skelton .................. B60L 50/16
702/183

FOREIGN PATENT DOCUMENTS

| DE | 10 2005 051 737 A1 | 5/2007 |
| DE | 10 2015 208 862 A1 | 11/2015 |
| DE | 10 2015 204 697 A1 | 4/2016 |
| DE | 10 2018 007 448 A1 | 3/2019 |
| WO | 2013/071143 A1 | 5/2013 |
| WO | 2013/174271 A1 | 11/2013 |

OTHER PUBLICATIONS

Erdmann et al., DE 102005051737 A1, Espacenet machine translation, 2005 (Year: 2005).*
Examination Report dated Dec. 30, 2020 in corresponding German application No. 10 2020 112 038.9; 10 pages including Machine-generated English-language translation.

* cited by examiner

*Primary Examiner* — Adam A Arciero
(74) *Attorney, Agent, or Firm* — Maier & Maier, PLLC

(57) ABSTRACT

A method for performing a test of a thermal management system for a vehicle. The thermal management system includes a number of thermal components and at least one sensor, wherein a setup of the thermal management system is tested by a control device before delivery of the vehicle when the thermal management system is or will be incorporated in the vehicle during a final assembly.

10 Claims, 1 Drawing Sheet

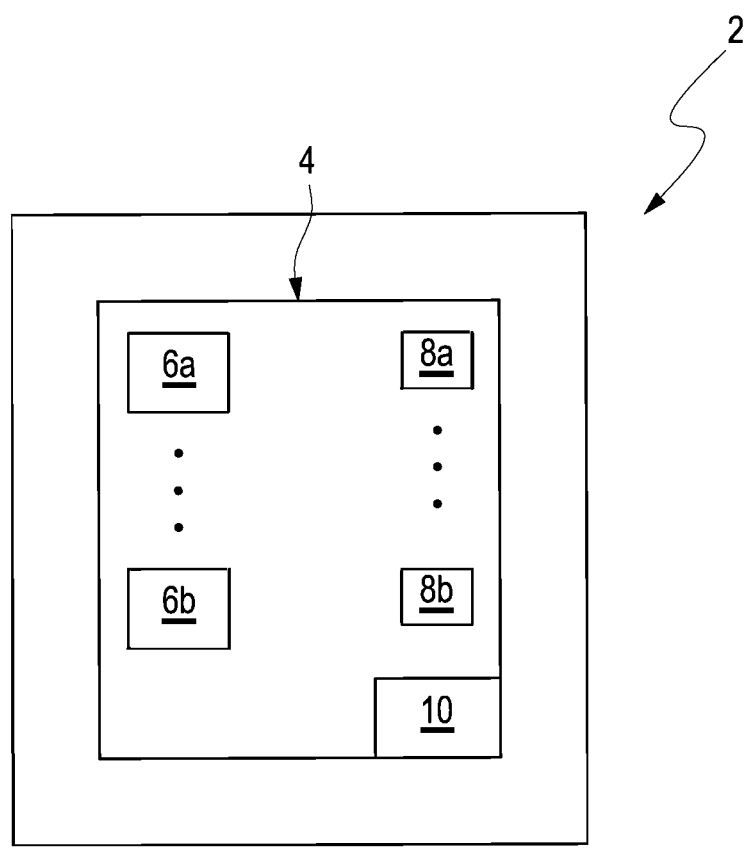

METHOD FOR PERFORMING A TEST OF A THERMAL MANAGEMENT SYSTEM

FIELD

The disclosure relates to a method for performing a test of a thermal management system and to a thermal management system.

BACKGROUND

The increasing functional complexity of thermal management systems which have to perform various functions such as, for example, heating and cooling of batteries as well as heat pump functionalities, requires a relative complex setup of such thermal management systems.

Due to the high number of hoses, valves and coupling sites, in spite of poka yoke and quality assurance, incorrect assemblies always occur again and again in the assembly of a thermal management system. They include primarily incorrect hose connections or defective connections of hoses and sensors to components of the thermal management system. Due to these defective setups, at least some functions of the thermal management system may not be available, and therefore the thermal management system cannot be delivered in that state to the customers. In addition, component damage can occur because cooling is not ensured. A heating performance or efficiency of the thermal management system is not in order under some circumstances, which can lead to reduced comfort or ranges. In addition, the workshops of partners are often overtaxed in the searching for defects or require very long times to find corresponding defects. Under some circumstances, a useless component exchange can also occur here. This leads to high warranty costs for the manufacturer. The quality image also suffers as a result of corresponding problems. Moreover, due to the complexity, the internal capacities for error cause analysis are tied to the respective quality assurance or development divisions.

A heat management system for an electric vehicle is known from published document DE 10 2015 208 862 A1.

Published document WO 2013/071143 A1 describes a simplified structure of a thermal management system for an electrically driven vehicle.

Published document WO 2013/174271 A1 describes a power system for an electric vehicle.

SUMMARY

Against this backdrop, an aim was to ensure the quality assurance of a thermal management system.

The method according to the disclosure is provided for the usually automatic performance of a test of a thermal management system for a vehicle, wherein the thermal management system comprises as components a number of thermal components and at least one sensor. In the method, a setup of the thermal management system is tested by a control device when or as soon as the complete or the completely assembled thermal management system is or will be or has been incorporated in the vehicle. This is possible when the thermal components are already connected to the at least one sensor and to the control device, which is possible, for example, before the delivery of the vehicle, even before the vehicle leaves a production site, for example, a plant.

The control device for performing the test will be and/or is associated with the thermal management system. Here, the control device can be designed as component of the thermal management system and be integrated in said system, wherein such a control device can also control a running operation of the already delivered vehicle. It is also possible to design the control device as a component of the vehicle and arrange it in the vehicle, but outside of the thermal management system.

Such a control device, if it is designed as component of the thermal management system, can, for the thermal management system or with the thermal management system, depending on the definition, perform a self-test of the thermal management system, as a possible test, and moreover also control the running operation of the thermal management system in the already delivered vehicle. Furthermore, in addition to functions of the thermal management system, such a control device of the vehicle can also control other functions of other vehicle systems independently of the thermal management system, as well as functions of other vehicle systems in combination with functions of the thermal management system. It is also possible for the control device to be designed as external component of the thermal management system and of the vehicle and to be associated with the thermal management system and connected to it only for performing the test, in particular the self-test, of the thermal management system, wherein such a control device is used as tool during the final control, but can also test other vehicle systems during the final control. Independently of where the control device used in the method is arranged, it comprises a computation unit and can be designed as or referred to as computer.

In the method, in an embodiment with the control device of the thermal management system, for example, in the context of a final control during a final assembly of the thermal management system and/or of the vehicle, usually of a motor vehicle, the self-test for the thermal management system can be performed as soon as the complete thermal management system is connected to other components of the vehicle and thus integrated therein, wherein the thermal management system and the control device interact with one another during the test, in particular during the self-test.

In the method, the setup or a structure of the thermal management system is tested by the control device and thus tested by the thermal management system itself, when the thermal components of the thermal management system are connected to the vehicle components of the vehicle during an assembly, for example, during the final assembly, or during a stay at a workshop, wherein the setup results from an assembly of the thermal components and the at least one sensor.

As a rule, at least one thermal component is actuated by the control device with at least one defined actuation value of at least one actuation parameter, wherein, by means of the at least one sensor, at least one actual value of at least one operating parameter, which results from the at least one defined actuation value of the at least one actuation parameter, is acquired, for example, measured. The at least one actual value of the at least one operating parameter is compared by the control device with at least one target value, provided for this purpose, of the at least one operating parameter, which should result from the at least one defined actuation value of the at least one actuation parameter for the at least one thermal component. The setup of the thermal management system is classified by the control device, for example, by its control device, as in order when the at least one actual value of the at least one operating parameter deviates from the target value provided for this purpose at most by a limit value or threshold value or tolerance value provided for this purpose. Alternatively, the setup of the thermal management system is classified by the control device, for example, by its control device, as defective or not in order when the at least one actual value of the at least one operating parameter deviates from the target value provided for this purpose by more than the limit value or threshold value or tolerance value provided for this purpose, wherein at least one defect is identified in this case by the control device for the at least one thermal component.

The at least one actuation parameter is an electrical variable, for example, a current which is passed by the control device through the at least one thermal component and/or vehicle component and/or a voltage which is applied by the control device to the at least one thermal component and/or vehicle component, wherein the at least one control parameter is made available, and thus provided for this purpose, to the at least one thermal component and/or vehicle component.

As the at least one operating parameter, a thermal variable, for example, a temperature of the at least one thermal component and/or vehicle component, for example, a temperature of a medium in the at least one thermal component and/or vehicle component, a temperature difference between two thermal components and/or vehicle components, a pressure of the medium in the at least one thermal component and/or vehicle component, a pressure difference between at least one thermal component and/or vehicle component, a pressure difference between two thermal components and/or vehicle components, a volume flow of the medium in the at least one thermal component and/or vehicle component and/or a flow rate of the medium in the at least one thermal component and/or vehicle component, is/are acquired, for example, measured and thus provided or taken into consideration by the sensors and/or the control device. The at least one operating parameter can alternatively or additionally be an electrical variable, for example, a current which flows through the at least one thermal component, or a voltage which is applied to the at least one thermal component, wherein such an electric variable can be acquired by the sensors and/or the control device. The at least one operating parameter can also be, for example, an electrical current of a pump or of a compressor as thermal component.

An error signal is generated by the control device when the thermal management system is classified as defective by the control device. Alternatively, a release signal is generated by the control device when the setup of the thermal management system is classified as in order by the control device.

In an embodiment, an operating parameter for a thermal component which is connected to at least one additional thermal component and/or vehicle component, or a common operating parameter for at least one thermal component and/or vehicle component for multiple thermal components and/or vehicle components connected to one another, can optionally be taken into consideration.

The thermal management system according to the disclosure is provided for a vehicle and comprises a number of thermal components and at least one sensor, wherein a control device is to be associated with, can be associated with and/or is associated with the thermal management system, wherein the thermal management system and the control device is designed with mutual interaction to test a setup of the thermal management system before the delivery of the vehicle, when the thermal management system is incorporated or has been incorporated in the vehicle during a final assembly.

In an embodiment, the thermal management system comprises the control device and is designed with interaction with the control device to perform a self-test as test. In an embodiment, the control device can be designed as component of the thermal management system. Here, the control device can test the setup of the thermal management system in which it is located.

In an embodiment, the thermal management system is designed for performing a test referred to as self-test, wherein the test can be performed, is to be performed or is performed by the thermal management system with regard to its setup. The control device is designed to test the setup of the thermal management system. This is possible, for example, during a final control of the thermal management system, when the thermal components are already connected to the at least one sensor and the control device, when or as soon as the complete thermal management system has been incorporated in the vehicle, usually during and/or after a final assembly, as a rule before the delivery of the vehicle, before the vehicle leaves the plant.

In the thermal management system, at least one thermal component is designed as pump for at least one medium of the thermal management system, as valve for the at least one medium of the thermal management system, as compressor, as heater or as heating module for the at least one medium of the thermal management system, as cooler or as cooling module or as chiller for the at least one medium of the thermal management system, as line, for example, as hose or as pipe, for the at least one medium of the thermal management system and/or as coupling site or as connection element, for example, as thread, flange and/or seal, between at least two, generally two different thermal components. Moreover, the at least one thermal component can be designed as condenser, as damper register or as expansion valve. The at least one thermal component is incorporated in the thermal management system.

In an embodiment, the thermal management system can be designed as a refrigeration circuit system, referred to as refrigeration circuit system, or comprise a refrigeration circuit system. Such a thermal management system can comprise an electrical compressor.

The at least one sensor is designed as temperature sensor, pressure sensor, as volume flow sensor and/or as flow sensor for at least one thermal component and/or for the at least one medium of the thermal management system. The at least one sensor can be also designed as combined sensor which can simultaneously measure the pressure and the temperature.

With the method, the thermal management system by performing a self-test can perform a verification of its setup or its structure when it is incorporated in the vehicle and its thermal components are connected to the vehicle components of the vehicle.

In addition to the quality measures already taken into consideration in construction and production, the self-test of the setup of the thermal management system is performed by the thermal management system already before the delivery or already during the assembly, for example, in the plant or in a workshop. Here, the thermal management system is checked by the sensors already located in the thermal management system, wherein, via the actuation of pumps, valves, heaters as thermal components, within limits, the setup and/or a state of the thermal management system can be confirmed as in order. At the same time, a workshop correspondingly can have a self-test performed by the thermal management system if it is suspected that there is a defect in the thermal management system.

Due to the requirements with regard to an on-board diagnosis (OBD) as well as necessary regulations, the thermal management system is in principle already equipped with numerous temperature and pressure sensors. Moreover, flows recorded by flow sensors can also be monitored on the part of the thermal management system.

The thermal management system, in particular its control device, then undertakes, by means of trained software, a plausibility check of the measured values or actual values when it is incorporated in the vehicle. The thermal management system can be brought into defined operating states within a short time period upon performance of the method. By means of sensors, a verification is then performed to determine whether the temperatures and pressures as operating parameters in the thermal management system are behaving as they do in a thermal management system to be classified as in order with regard to its setup. If it is determined by the control device that certain actual values acquired by sensors are behaving out of order, the control device outputs an error message with regard to a setup of the thermal management system. If, in an embodiment, the control device is designed as component of the thermal management system, it is possible, depending on the definition, that the thermal management system can output an error message with regard to its setup.

In an additional setup state, a discovered defect is defined more precisely. If the self-test or a self-diagnosis expects, for example, a temperature difference of T1−T2=5° C. as correct target value, whereas the measured actual value is −5° C., wherein the actual value then corresponds to the negative target value, a possible error cause can be a reversing of sensor connections or reversed hosing. By the self-diagnosis of a defect, the control device and/or the thermal management system, for example, its control device, of a workshop or production personnel can output a notification as to where the defect may possibly be located.

In an additional embodiment, in the context of the self-test, a comparison of an intake of current by at least one pump of the thermal management system is performed. In this case, the thermal management system is brought via certain settings of valves overall into a defined setting and the at least one pump is actuated by the control device. For this purpose, in the software and/or a memory of the control device, different target values for operating parameters can be stored. Here, for example, a target value of a current can be, for example, 5 amperes, when the setup of the thermal management system is in order. However, if the thermal management system is set up incorrectly or when a volume flow of the medium is blocked by defective thermal components or components, the actual value of the recorded flow deviates from the specified target value, wherein, in this case, an error message is output by the thermal management system.

In order to detect possible error sources with greater precision, all the thermal components which are installed as components in the thermal management system are correspondingly actuated, and resulting sensor signals for actual values are correspondingly evaluated.

The control device which can be designed as component of the thermal management system can also be designed as control device and/or referred to as control device, wherein the control device can control the thermal components, for example, pumps and valves, of the thermal management system and thus control or actuate them with actuation values. Furthermore, the control device compares measured actual values of operating parameters with target values provided for this purpose. Moreover, the control device can indicate or display errors and output possible causes of implausible actual values.

The thermal management system itself can control its setup or setup state within certain limits. The probability that a defective thermal management system reaches the client is clearly reduced. Warranty costs for the manufacturer can decrease as a result of fewer damaged components. Likewise, warranty costs can decrease due to more infrequent and less expensive defect searching by the retail seller. Costs due to less support expenditure on the part of a quality assurance and development division can also decrease. Any deficiencies in the setup of the thermal management system can be recognized more rapidly by the thermal management system within limits and be fixed even before a delivery of the vehicle. This results in a quality improvement due to early detection of a defective setup. By performing the self-diagnosis, with regard to construction, there are fewer requirements with regard to absence of exchangeability or corresponding reverse polarity protection, so that components can become cheaper.

The presented method can already be performed with the presented thermal management system during the assembly of the entire vehicle, when the thermal management system is already mounted in the vehicle and incorporated the vehicle in a functioning state, and when the vehicle has not yet left its production site or assembly. Thus, for example, quality problems due to reversed plugs and/or hoses as thermal components can be prevented when, by means of the thermal management system which is already incorporated in the vehicle, the self-test or the self-diagnosis is performed while still in the production site of the vehicle, in order to detect a possibly defective setup while still in the plant as production site. If a defect is detected during the self-test by the control device which can control the process, it is reported automatically with the corresponding error message. Thus, it is pointed out that corrective work should be performed on the thermal management system.

It is understood that the above-mentioned features and those yet to be explained further below are usable not only in the indicated combination but also in other combinations or alone without leaving the scope of the present disclosure.

BRIEF DESCRIPTION OF THE FIGURE(S)

The disclosure is represented diagrammatically in the drawing based on embodiments and described diagrammatically and in detail in reference to the drawing.

FIG. 1 shows, in a diagrammatic representation, an embodiment of the thermal management system according to the disclosure for carrying out an embodiment of the method according to the disclosure.

DETAILED DESCRIPTION

FIG. 1 shows, in a diagrammatic representation, a vehicle 2, here a motor vehicle or a car, in which the embodiment of the thermal management system 4 according to the disclosure is arranged, i.e., incorporated and/or installed therein.

This thermal management system 4 comprises multiple thermal components 6a, 6b which are designed, for example, as pumps, valves, heaters or lines. In addition, the thermal management system 4 comprises multiple sensors 8a, 8b which are designed, for example, as temperature sensors or thermometers, pressure sensors and electrical sensors 8a, 8b, for example, current measuring devices and voltage measuring devices. Moreover, the thermal management system 4, in the embodiment presented here, comprises a control device 10 which is designed to control an operation of the thermal management system 4 in the vehicle 2 and thus subject it to open-loop and/or closed-loop control.

In addition, the control device 10 of the thermal management system 4 is designed, in the embodiment of the method according to the disclosure, to perform a self-test of the thermal management system 4 with regard to its setup and/or its structure and in the process to control the process, i.e., subject it to open-loop and/or closed-loop control.

It is provided that individual components of the thermal management system 4, i.e., the thermal components 6a, 6b, the sensors 8a, 8b and the control device 10, after they have each been produced individually, are assembled to form the thermal management system 4, wherein the thermal management system 4 is constructed from its components. For this purpose, the components of the thermal management system 4, that is to say the thermal components 6a, 6b, the sensors 8a, 8b and the control device 10, are connected together or to one another. As soon as the thermal management system 4 is assembled as a distinct unit, it is incorporated in the vehicle 2 in a production site of the vehicle 2 when the vehicle 2 is still in the production site during its assembly, for example, in the plant, wherein the thermal components 6a, 6b are connected to vehicle components of the vehicle 2.

As soon as the thermal management system 4 is incorporated in the vehicle 2, wherein it is possible that the entire vehicle 2 has not yet been completely constructed or assembled, in the context of the embodiment of the method, by means of the control device 10, a self-test or a self-diagnosis of the thermal management system 4 is performed, wherein the thermal management system 4 with its control device 10 tests itself with regard to its setup or with regard to its structure by means of its control device 10.

For this purpose, it is provided that actuation values for actuation parameters and target values for operating parameters of thermal components 6a, 6b are stored in a memory of the control device 10. Proceeding from a computation unit of the control device 10, the thermal components 6a, 6b are actuated with the actuation values for the actuation parameters. In the process, for the thermal components 6a, 6b, actual values for operating parameters result, which are acquired and thus measured by the sensors 8a, 8b, wherein these actual values are transmitted to the control device 10 which compares the actual values with the designated target values. Here, it can be taken into consideration that a particular target value of an operating parameter is correlated with a particular actuation value of an actuation parameter, wherein a respective particular target value should result when a thermal component 6a, 6b is actuated with a respective particular correlated actuation value.

If, by means of the control device 10, it is determined that at least one actual value of an operating parameter for a thermal component 6a, 6b deviates from a target value provided for this purpose by a difference which is greater than a threshold value or tolerance value provided for this purpose, for the setup of the thermal management system 4, a defect is identified, and the setup of the thermal management system 4 is classified as not in order. Here, it is possible that the control device 10 provides acoustic and/or optical information on the defect via a display device.

If alternatively, during the self-test, it is determined that acquired actual values of operating parameters deviate at most by respective designated threshold values or tolerance values, the thermal management system 4 is classified by the control device 10 as in order with regard to its setup.

LIST OF REFERENCE NUMERALS

2 Vehicle
4 Thermal management system
6a, 6b Thermal component
8a, 8b Sensor
10 Control device

The invention claimed is:

1. A method for performing a test of a thermal management system for a vehicle, wherein the thermal management system comprises a number of thermal components and at least one sensor, wherein a setup of the thermal management system is tested by a control device before delivery of the vehicle when the thermal management system is or will be incorporated in the vehicle during a final assembly,
   actuating, by the control device, at least one thermal component with at least one defined actuation value of at least one actuation parameter, wherein the at least one actuation parameter is a current which is passed by the control device through the at least one thermal component or a voltage applied by the control device to the at least one thermal component,
   acquiring, by the at least one sensor, at least one actual value of at least one operating parameter resulting from the at least one defined actuation value of the at least one actuation parameter,
   wherein the at least one operating parameter is at least one of a temperature of a medium in the at least one thermal component, a temperature difference between two thermal components, a pressure of the medium in the at least one thermal component, a pressure difference between two thermal components, a volume flow of the medium in the at least one thermal component, or a flow rate of the medium in the at least one thermal component,
   comparing, by the control device, the at least one actual value of the at least one operating parameter with at least one stored target value of the at least one operating parameter resulting from the at least one defined actuation value of the at least one actuation parameter for the at least one thermal component,
   wherein if the at least one actual value of the at least one operating parameter deviates from the target value by less than or equal to a predetermined limit value, classifying, by the control device, the setup of the thermal management system as in order,
   wherein if the at least one actual value of the at least one operating parameter deviates from the target value by more than the predetermined limit value, classifying, by the control device, the setup of the thermal management system as defective.

2. The method according to claim 1, wherein the setup of the thermal management system is tested by the control device when the thermal components are connected to vehicle components of the vehicle during a final assembly of the vehicle.

3. The method according to claim 1, wherein an error signal is generated by the control device when the thermal management system is classified as defective by the control device, and in which a release signal is generated by the control device when the thermal management system is classified by the control device as in order.

4. A thermal management system for a vehicle, wherein the thermal management system comprises: a number of thermal components and at least one sensor, wherein a control device is associated with the thermal management system, wherein the thermal management system and the control device are designed to test a setup of the thermal management system before delivery of the vehicle when the thermal management system is installed in the vehicle during a final assembly wherein the control device actuates at least one thermal component with at least one defined actuation value of at least one actuation parameter, wherein the at least one actuation parameter is a current which is passed by the control device through the at least one thermal component or a voltage applied by the control device to the at least one thermal component, wherein the sensor acquires at least one actual value of at least one operating parameter resulting from the at least one defined actuation value of the at least one actuation parameter, wherein the at least one operating parameter is at least one of a temperature of a medium in the at least one thermal component, a temperature difference between two thermal components, a pressure of the medium in the at least one thermal component, a pressure difference between two thermal components, a volume flow of the medium in the at least one thermal component, or a flow rate of the medium in the at least one thermal component, wherein the control device compares the at least one actual value of the at least one operating parameter with at least one stored target value of the at least one operating parameter resulting from the at least one defined actuation value of the at least one actuation parameter for the at least one thermal component, wherein the control device classifies the setup of the thermal management system as in order if the at least one actual value of the at least one operating parameter deviates from the target value by less than or equal to a predetermined limit value, wherein the control device classifies the setup of the thermal management system as defective if the at least one actual value of the at least one operating parameter deviates from the target value by more than the predetermined limit value.

5. The thermal management system according to claim 4, in which at least one thermal component is designed as pump, as valve, as heater, as cooler, as line, as compressor, as condenser, as heat exchanger and/or as coupling site.

6. The thermal management system according to claim 4, wherein the at least one sensor is designed as temperature sensor, pressure sensor, as volume flow sensor and/or as flow sensor.

7. The thermal management system according to claim 4, wherein the control device is a component of the thermal management system.

8. The thermal management system according to claim 5, wherein the at least one sensor is designed as temperature sensor, pressure sensor, as volume flow sensor and/or as flow sensor.

9. The thermal management system according to claim 5, wherein the control device is a component of the thermal management system.

10. The thermal management system according to claim 6, wherein the control device is a component of the thermal management system.

* * * * *